United States Patent
Xu et al.

(10) Patent No.: US 12,166,710 B2
(45) Date of Patent: Dec. 10, 2024

(54) DMRS CONFIGURATION METHOD AND USER EQUIPMENT

(71) Applicant: GUANGDONG OPPO MOBILE TELECOMMUNICATIONS CORP., LTD., Guangdong (CN)

(72) Inventors: Jing Xu, Dongguan (CN); Yanan Lin, Dongguan (CN); Yun Fang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 323 days.

(21) Appl. No.: 17/452,437

(22) Filed: Oct. 27, 2021

(65) Prior Publication Data

US 2022/0045814 A1 Feb. 10, 2022

Related U.S. Application Data

(63) Continuation of application No. PCT/CN2019/085383, filed on Apr. 30, 2019.

(51) Int. Cl.
*H04L 5/00* (2006.01)
*H04W 72/0446* (2023.01)

(52) U.S. Cl.
CPC ....... *H04L 5/0048* (2013.01); *H04W 72/0446* (2013.01)

(58) Field of Classification Search
CPC ... H04L 5/0023; H04L 5/0044; H04L 5/0048; H04L 5/0051; H04L 5/0078; H04L 5/0092; H04L 5/0094; H04L 25/0226; H04L 27/2602; H04L 27/261; H04W 72/0446; H04W 72/1268; H04W 72/20; H04W 72/23
See application file for complete search history.

(56) References Cited

U.S. PATENT DOCUMENTS

| | | | | |
|---|---|---|---|---|
| 11,405,905 B2* | 8/2022 | Hwang | ................. | H04W 52/08 |
| 11,510,229 B2* | 11/2022 | Liu | ...................... | H04W 52/146 |
| 11,778,617 B2* | 10/2023 | Yang | ...................... | H04W 72/21 370/329 |
| 11,791,951 B2* | 10/2023 | Vilaipornsawai | ..... | H04L 5/0044 370/329 |

(Continued)

FOREIGN PATENT DOCUMENTS

| CN | 107547455 A | 1/2018 |
|---|---|---|
| CN | 109274472 A | 1/2019 |

(Continued)

OTHER PUBLICATIONS

Nokia et al. "Remaining issues on reference signals and QCL" R1-1809238; 3GPP TSG RAN WG1 Meeting #94; Gothenburg, Sweden; Aug. 20-24, 2018. 14 pages.

(Continued)

*Primary Examiner* — Eric Nowlin
(74) *Attorney, Agent, or Firm* — Perkins Coie LLP

(57) ABSTRACT

Disclosed in the present invention are a DMRS configuration method and a user equipment. Said method comprises: determining a time domain position of a first DMRS according to a first PUSCH duration and DMRS configuration information, the first PUSCH being obtained by splitting a second PUSCH.

14 Claims, 5 Drawing Sheets

(56) References Cited

U.S. PATENT DOCUMENTS

| | | | |
|---|---|---|---|
| 11,831,578 | B2* | 11/2023 | Wang .................... H04L 5/0057 |
| 2019/0052420 | A1 | 2/2019 | Manolakos et al. |
| 2020/0052827 | A1* | 2/2020 | Vilaipornsawai ..... H04L 5/0044 |
| 2020/0220698 | A1* | 7/2020 | Zhang ...................... H04L 5/10 |
| 2021/0068130 | A1* | 3/2021 | Liu .................. H04W 72/0453 |
| 2021/0068140 | A1* | 3/2021 | Yang ..................... H04W 72/21 |
| 2021/0084631 | A1* | 3/2021 | Kim ...................... H04L 5/0048 |
| 2021/0153207 | A1* | 5/2021 | Bhamri ................ H04L 5/0051 |
| 2021/0243781 | A1* | 8/2021 | Lei ....................... H04L 5/0051 |
| 2021/0250142 | A1* | 8/2021 | Wang ................... H04L 5/0053 |
| 2021/0282137 | A1* | 9/2021 | Wang ................... H04L 5/0055 |
| 2021/0377937 | A1* | 12/2021 | Takeda ................. H04W 72/20 |
| 2022/0022184 | A1* | 1/2022 | Lu ............................ H04L 1/08 |
| 2022/0104219 | A1* | 3/2022 | Sridharan ......... H04W 72/1263 |
| 2022/0132485 | A1* | 4/2022 | Takeda ................. H04L 5/0094 |
| 2022/0132533 | A1* | 4/2022 | Taherzadeh Boroujeni ................ H04W 72/1268 |
| 2022/0150003 | A1* | 5/2022 | Takeda ................ H04L 1/1896 |
| 2022/0150838 | A1* | 5/2022 | Takeda ................ H04L 1/1893 |
| 2023/0422252 | A1* | 12/2023 | Yang ................ H04W 72/1268 |
| 2024/0031010 | A1* | 1/2024 | Ye ......................... H04L 5/0091 |
| 2024/0163012 | A1* | 5/2024 | Liu ..................... H04W 72/232 |
| 2024/0205841 | A1* | 6/2024 | Zhu ...................... H04L 5/0051 |

FOREIGN PATENT DOCUMENTS

| | | | | |
|---|---|---|---|---|
| CN | 110474754 | A | * 11/2019 | ........... H04L 1/1614 |
| CN | 110830183 | A | * 2/2020 | ............... H04L 1/08 |
| CN | 110351857 | B | * 6/2020 | ........... H04L 5/0048 |
| CN | 109787728 | B | * 10/2020 | ............. H04B 1/713 |
| CN | 111757487 | A | * 10/2020 | ........... H04L 1/0026 |
| CN | 111919415 | A | * 11/2020 | ........... H04L 5/0048 |
| CN | 112219364 | A | * 1/2021 | ............... H04L 1/08 |
| CN | 113938264 | A | * 1/2022 | ........... H04L 1/1614 |
| CN | 111757487 | B | * 4/2022 | ........... H04L 1/0026 |
| CN | 115053497 | A | * 9/2022 | ............... H04L 1/08 |
| CN | 110830183 | B | * 9/2023 | ............... H04L 1/08 |
| EP | 3396914 | A1 | * 10/2018 | ............... H04B 7/04 |
| EP | 3609104 | A1 | * 2/2020 | ............... H04L 1/189 |
| EP | 3780444 | A1 | * 2/2021 | ............... H04L 1/08 |
| EP | 3927029 | A1 | * 12/2021 | ............. H04B 1/713 |
| EP | 3927047 | A1 | * 12/2021 | ............. H04B 1/713 |
| EP | 3927050 | A1 | * 12/2021 | ........... H04L 5/0044 |
| EP | 3694130 | B1 | 1/2022 | |
| EP | 3827540 | B1 | * 4/2024 | ............... H04L 1/08 |
| JP | 7273071 | B2 | * 5/2023 | ........... H04L 5/0044 |
| JP | 7273072 | B2 | * 5/2023 | ............. H04B 1/713 |
| KR | 20200144112 | A | * 12/2020 | |
| KR | 20210031995 | A | * 3/2021 | |
| KR | 20220054594 | A | * 5/2022 | |
| TW | 202127949 | A | * 7/2021 | ........... H04L 1/0061 |
| WO | 2017107212 | A1 | 6/2017 | |
| WO | 2018212628 | A1 | 11/2018 | |
| WO | WO-2019091488 | A1 | * 5/2019 | ............. H04B 1/713 |
| WO | WO-2019193732 | A1 | * 10/2019 | ............... H04L 1/08 |
| WO | WO-2019216607 | A1 | * 11/2019 | ........... H04L 1/1614 |
| WO | WO-2020165997 | A1 | * 8/2020 | ........... H04L 5/0044 |
| WO | WO-2020165998 | A1 | * 8/2020 | ............. H04B 1/713 |
| WO | WO-2020166022 | A1 | * 8/2020 | ............. H04B 1/713 |
| WO | WO-2021041380 | A1 | * 3/2021 | ........... H04L 1/0061 |

OTHER PUBLICATIONS

Notice of Reasons for Refusal for Japanese Application No. 2021-564678 issued Aug. 30, 2022. 6 pages with English translation.
TCL Communication "Potential Enhancements to PUSCH" R1-1902546; 3GPP TSG RAN WG1 Meeting #96; Athens, Greece; Feb. 25-Mar. 1, 2019. 7 pages.
Vivo "Remaining details on DMRS design" R1-1715623; 3GPP TSG RAN WG1 NR Ad Hoc #3; Nagoya, Japan; Sep. 18-21, 2017. 11 pages.
Examination Report for Indian Application No. 202127052579 mailed Apr. 6, 2022. 6 pages with English translation.
Extended European Search Report for European Application No. 19927183.4 issued Mar. 11, 2022. 10 pages.
Huawei et al. "PUSCH enhancements for URLLC" R1-1901599; 3GPP TSG RAN WG1 Meeting #96; Athens, Greece; Feb. 25-Mar. 1, 2019. 13 pages.
Nokia et al. "Summary of Tuesday offline discussion on potential enhancements for PUSCH for NR URLLC (AI 7.2.6.1.3)" R1-1903480; 3GPP TSG-RAN WG1 Meeting #96; Athens, Greece; Feb. 25-Mar. 1, 2019. 30 pages.
International Search Report mailed Jan. 9, 2020 in App. No. PCT/CN2019/085383, Jan. 9, 2020, 4 pp.
"3rd Generation Partnership Project; Technical Specification Group Radio Access Network; NR; Physical channels and modulation (Release 15, Dec. 2018)", 3GPP TS 38.211 V15.4.0 (Dec. 2018), Dec. 2018, 96 pp.
Huawei , "PUSCH enhancements for URLLC", 3GPP TSG RAN WG1 Meeting #95, R1-1812223, Spokane, USA, Nov. 12-16, 2018, Nov. 2018, 6 pp.
Examination Report for European Application No. 19927183.4 issued Dec. 1, 2022. 7 pages.
First Office Action for Chinese Application No. 2021112184608 issued Jan. 13, 2023. 16 pages with English translation.
Huawei et al. "PUSCH enhancements for URLLC" R1-1900046; 3GPP TSG RAN WG1 Ad-Hoc Meeting 1901; Taipei; Jan. 21-25, 2019. 12 pages with English translation.
Nokia et al. "Summary of offline discussion on potential enhancements for PUSCH for NR URLLC (AI 7.2.6.1.3)" R1-1903700; 3GPP TSG RAN WG1 Meeting #96; Athens, Greece; Feb. 25-Mar. 1, 2019. 39 pages.
Notice of Reasons for Refusal for Japanese Application No. 2021-564678 issued Jan. 17, 2023. 6 pages with English translation.
Second Office Action of Chinese application No. 202111218460.8 issued on Mar. 29, 2023. 12 pages with English translation.
Decision of Rejection of Chinese application No. 202111218460.8 issued on Jun. 9, 2023. 11 pages with English translation.
Notice of Preliminary Rejection for Korean Application No. 10-2021-7038892 issued Jul. 24, 2024. 9 pages with English translation.
"3rd Generation Partnership Project; Technical Specification Group Radio Access Network; NR; Physical channels and modulation(Release 15)"; 3GPP TS 38.211 V15.2.0 (Jun. 2018). 96 pages.
NTT Docomo, Inc., "sPUSCH for shortened TTI", R1-167371, 3GPP TSG RAN WG1 Meeting #86, Gothenburg, Sweden Aug. 22-26, 2016. 7 pages.

* cited by examiner

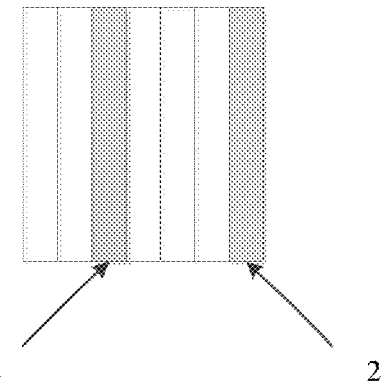
FIG. 1d
Determine a time domain position of a first DMRS according to a duration of a first PUSCH and DMRS configuration information  21
FIG. 2
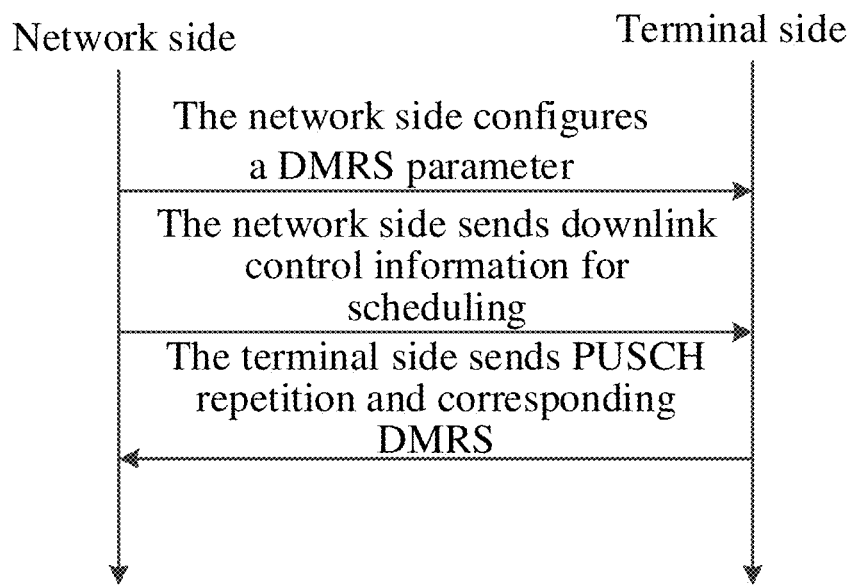
FIG. 3

Determine time domain positions of M DMRSs respectively according to durations of M PUSCHs and DMRS configuration information — 31

First processing unit
41

Second processing
unit 51

DMRS CONFIGURATION METHOD AND USER EQUIPMENT

CROSS-REFERENCE TO RELATED APPLICATION

The present application is a continuation application of International PCT Application No. PCT/CN2019/085383, filed on Apr. 30, 2019, the entire content of which is hereby incorporated by reference.

TECHNICAL FIELD

The present invention relates to the technical field of information processing, in particular to a DMRS configuration method and a user equipment (UE).

BACKGROUND

NR Rel16 enhances PUSCH repetition and relaxes some restrictions, that is, there may be one or more PUSCHs in each slot, and the time domain resources of the PUSCHs may be different, as shown in FIG. 1a and FIG. 1b. FIG. 1a includes a case where a PUSCH crosses slots, and FIG. 1b includes a case where multiple PUSCHs are contained in one slot. Because the application scenario is no longer limited, data can be scheduled immediately, thus reducing the data transmission delay.

However, the DMRS is configured for an initial PUSCH, and when the PUSCH is split, the duration of the PUSCH will change, as shown in FIGS. 1a and 1b. How to configure an additional DMRS for the PUSCH after splitting needs to be solved.

SUMMARY

In order to solve the above technical problem, embodiments of the present invention provide a DMRS configuration method and a UE.

In a first aspect, a DMRS configuration method is provided, which is applied to a user equipment (UE) and includes: determining a time domain position of a first DMRS according to a duration of a first PUSCH and DMRS configuration information; wherein the first PUSCH is obtained by splitting a second PUSCH.

In a second aspect, a DMRS configuration method is provided, wherein the method includes: determining time domain positions of M DMRSs respectively according to durations of M PUSCHs and DMRS configuration information, wherein M is an integer greater than or equal to 2.

In a third aspect, a UE is provided, which includes: a first processing unit which determines a time domain position of a first DMRS according to a duration of a first PUSCH and DMRS configuration information; wherein the first PUSCH is obtained by splitting a second PUSCH.

In a fourth aspect, a UE is provided, which includes: a second processing unit which determines time domain positions of M DMRSs respectively according to durations of M PUSCHs and DMRS configuration information, wherein M is an integer greater than or equal to 2.

In a fifth aspect, a DMRS configuration method is provided, which is applied to a network device and includes: configuring DMRS configuration information; receiving a first physical uplink shared channel (PUSCH) and a first DMRS corresponding to the first PUSCH; wherein the first PUSCH is obtained by splitting a second PUSCH, and a time domain position of the first DMRS is determined according to a duration of the first PUSCH and the DMRS configuration information.

By adopting the above solution, the DMRS can be configured according to the number of symbols of the first PUSCH obtained by splitting, so that the reconfigured first DMRS can match the first PUSCH obtained by splitting, ensuring its tracking of the channel in the time domain and improving the channel estimation performance.

BRIEF DESCRIPTION OF DRAWINGS

FIG. 1d is a schematic diagram of DMRS configuration.

FIG. 2 is a first schematic flow chart of a method provided by an embodiment of the present invention.

FIGS. 3-11 are schematic diagrams of various feedbacks for downlink transmission.

FIG. 12 is a second schematic flow chart of a method provided by an embodiment of the present invention.

FIGS. 13 and 14 are schematic diagrams of structures of UEs provided by embodiments of the present invention.

DETAILED DESCRIPTION

In order to be able to learn features and technical contents of embodiments of the present invention in more detail, implementations of the embodiments of the present invention will be described below with reference to accompanying drawings, and the accompanying drawings are used for reference only and are not used for limiting the embodiments of the present invention.

Technical solutions in embodiments of the present application will be described below with reference to the drawings in the embodiments of the present application. It is apparent that the embodiments described are just some of the embodiments of the present application, but not all of the embodiments of the present application. According to the embodiments of the present application, all other embodiments achieved by a person of ordinary skill in the art without making inventive efforts are within the protection scope of the present application.

The technical solutions of the embodiments of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system, etc.

Figure 1A:
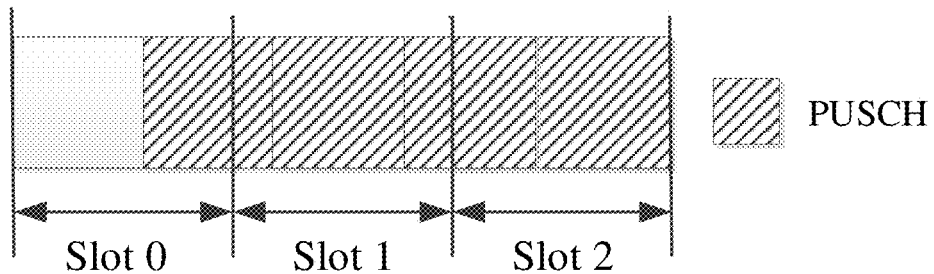
FIGS. 1a-1b are schematic diagrams of scenario architectures.
Figure 1B:
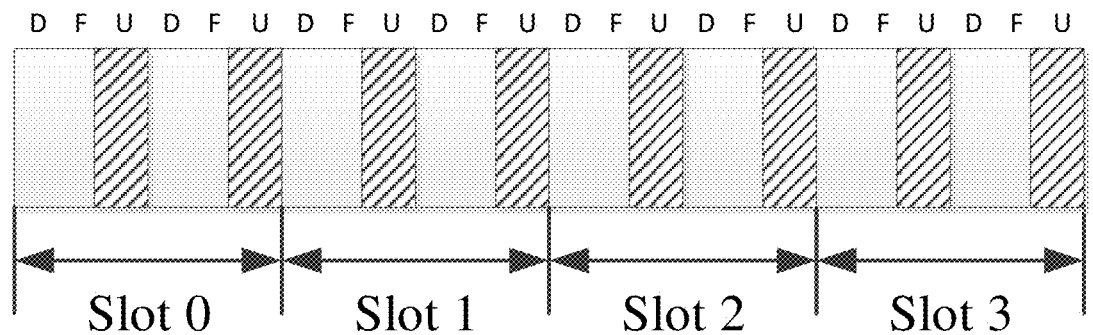
Figure 1C:
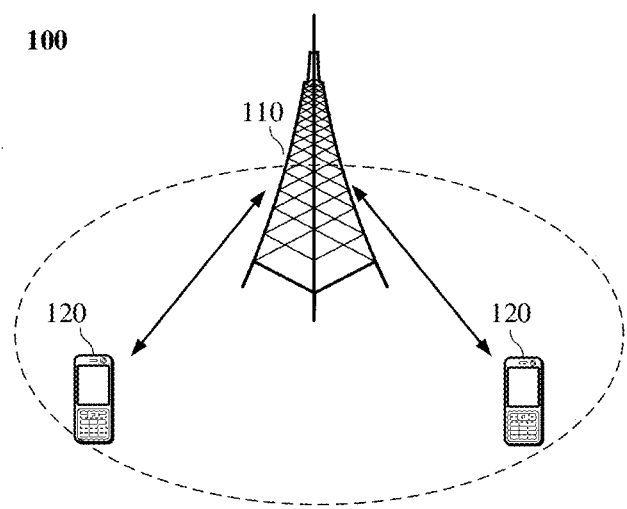
FIG. 1c is a first schematic diagram of an architecture of a communication system provided by an embodiment of the present application.

Illustratively, a communication system 100 to which an embodiment of the present application is applied may be as shown in FIG. 1c. The communication system 100 may include a network device 110, wherein the network device 110 may be a device that communicates with a UE 120 (or referred to as a communication terminal, or a terminal). The network device 110 may provide communication coverage for a specific geographical area, and may communicate with UE located within the coverage area. Optionally, the network device 110 may be a network device (Base Transceiver Station (BTS)) in a GSM system or CDMA system, a network device (NodeB (NB)) in a WCDMA system, an Evolutional network device (Evolutional Node B (eNB or eNodeB)) in a LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 further includes at least one UE 120 located within the coverage range of the network device 110. As used herein, the term "UE" includes, but is not limited to, a device configured to connect via a wired circuit, for example, via a Public Switched Telephone Network (PSTN), a Digital Subscriber Line (DSL), a digital cable, a direct cable; and/or via another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or via another UE, and configured to receive/send a communication signal; and/or an Internet of Things (IoT) device. A UE configured to communicate via a wireless interface may be referred to as a "wireless communication terminal", a "wireless terminal" or a "mobile terminal".

Optionally, a Device to Device (D2D) communication may be performed between the UEs 120.

It should be understood that the terms "system" and "network" are often used interchangeably herein. The term "and/or" herein describes an association relation between associated objects only, indicating that there may be three relations, for example, A and/or B may indicate three cases: A alone, both A and B, and B alone. In addition, the symbol "I" herein generally indicates that there is a "or" relationship between the associated objects before and after "/".

For learning features and technical contents of embodiments of the present invention in more detail, implementations of the embodiments of the present invention will be described below with reference to accompanying drawings, and the accompanying drawings are used for reference only and are not used for limiting the embodiments of the present invention.

An embodiment of the present invention provides a DMRS (demodulation reference signal) configuration method, which is applied to a user equipment (UE). As shown in FIG. 2, the method includes act 21.

In act 21, a time domain position of a first DMRS is determined according to a duration of a first PUSCH and DMRS configuration information.

Herein the first PUSCH is obtained by splitting a second PUSCH.

The DMRS configuration information includes at least one of a DMRS starting position and a DMRS additional position.

As shown in FIG. 1d, a DMRS consists of two parts, i.e., a Front-load DMRS indicated by 1 in the figure and an additional DMRS indicated by 2 in the figure. A position of the Front-load DMRS is fixed, and the Front-load DMRS is configured by a higher layer signaling or the Front-load DMRS is located on a starting symbol of a data shared channel (when a time domain resource indication mode is Type B). A position of the additional DMRS is determined by a higher layer signaling and a duration (number of symbols) of data.

It should be understood that the solution provided in this embodiment may further include: a time domain position of a second DMRS is determined according to a duration of a second PUSCH and DMRS configuration information.

That is, the time domain position of the second DMRS may be determined in advance based on the second PUSCH and the DMRS configuration information.

When the second PUSCH is split to obtain at least one first PUSCH, then the time domain position of the first DMRS corresponding to the first PUSCH may be determined according to the duration of the first PUSCH and the DMRS configuration information.

Herein, the time domain position of the second DMRS may be truncated based on the duration of the first PUSCH.

That is, the time domain positions of the first DMRS and the second DMRS may be same or different, and the first DMRS may be obtained by truncating the second DMRS.

Or, the time domain position of the first DMRS is determined according to the duration of the first PUSCH, the DMRS configuration information and a second correspondence relation; wherein the second correspondence relation is a correspondence relation among durations of PUSCHs, DMRS configuration information and time domain positions of DMRSs. That is to say, there is still a case where the time domain position of the first DMRS is re-determined, instead of truncating the second DMRS to obtain the first DMRS.

It should also be noted that in this embodiment, in the at least one first PUSCH obtained by splitting the second PUSCH, the durations of different first PUSCHs may be same or different.

For example, in this embodiment, according to a duration of a first PUSCH obtained by splitting, a time domain position of an additional DMRS in a DMRS may be updated, or the additional DMRS may be truncated. Therefore, the first DMRS can match the first PUSCH obtained by splitting, ensuring its tracking of the channel in time domain and improving channel estimation performance.

A main flow of this embodiment will be explained with reference to FIG. 3. Firstly, a UE receives a DMRS parameter configured by a network side; then, the network side sends downlink control information (DCI) to the UE, wherein the DCI is used for scheduling PUSCH repetition transmission; and the UE sends the PUSCH repetition and its corresponding DMRS to the network side, that is, sends a first PUSCH and a first DMRS corresponding to the first PUSCH to the network side.

This embodiment is described below through various processing cases.

Processing Case 1

The first PUSCH is obtained by splitting the second PUSCH at a slot boundary. Furthermore, according to a duration of the PUSCH obtained by splitting, an existing protocol is queried to determine a time domain position of the DMRS. Therefore, the first DMRS can match the first PUSCH obtained by splitting, ensuring its tracking of the channel in the time domain and improving channel estimation performance.

In act 1, a network side configures a DMRS parameter, wherein the DMRS parameter includes dmrs-AdditionalPosition for indicating the number of sets of additional DMRSs.

For example, dmrs-AdditionalPosition=pos1.

Furthermore, optional values of dmrs-AdditionalPosition are pos0, post and pos3. When the network side device needs to configure one of these three values, the network side device will configure it directly. If the network side device does not configure the dmrs-AdditionalPosition, pos2 is adopted by default. Herein pos0, pos1, pos2 and pos3 correspond to 0, 1, 2 and 3 in table 1.

In act 2, a terminal side receives the DMRS parameter.

In act 3, the network side sends downlink control information for scheduling PUSCH repetition transmission.

Figure 4:
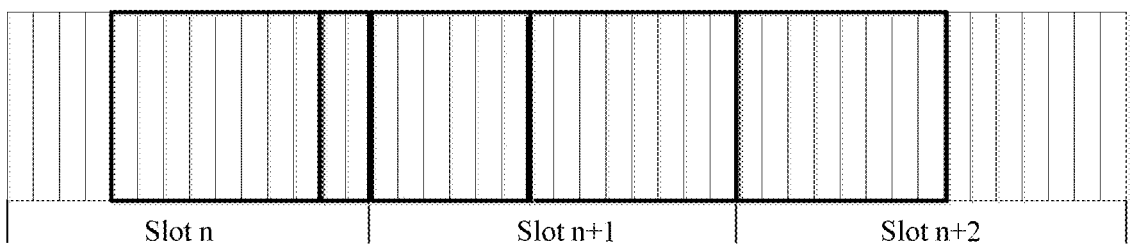

For example, the network side sends UL grant for scheduling the PUSCH repetition transmission. TypeB is the time domain resource indication mode. For example, the number of the PUSCH repetitions is 4, a time domain position of a $1^{st}$ PUSCH repetition is the $5^{th}$ to $12^{th}$ symbols of the $n^{th}$ slot, and a subsequent PUSCH repetition immediately follows a resource of a previous PUSCH repetition in the time domain. Therefore, the time domain resources of the four PUSCH repetitions can be known as shown in FIG. 4. In addition, four repetitions of the second PUSCH are split into five repetitions of the first PUSCH for a slot boundary is crossed.

In act 4, the terminal side receives the downlink control information and repeatedly sends the first PUSCH and the corresponding DMRS according to the downlink control information.

Figure 5:
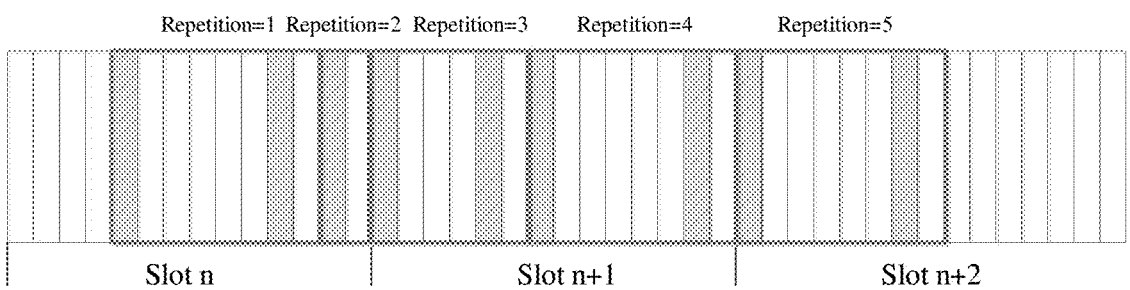

In act 4.1, the terminal side receives the downlink control information, and determines transmission resources for repeatedly sending the first PUSCH and time domain positions of corresponding first DMRSs according to the downlink control information, as shown in FIG. 5.

Case 1: The PUSCH does not Cross a Slot Boundary

A time domain position of a second DMRS is determined according to a duration of the second PUSCH, DMRS configuration information, and a first correspondence relation; wherein the first correspondence relation is a correspondence relation among durations of PUSCHs, DMRS configuration information and time domain positions of DMRSs. The first correspondence relation is predefined.

For a PUSCH which is not split, as shown by the DMRS configurations of the 1st, 4th and 5th repetition transmissions of the second PUSCH in FIG. 5, table 1 is looked up to determine that a time domain position of its DMRS is the first and the seventh symbols in the PUSCH according to a second time domain resource indication mode Type B, dmrs-AdditionalPosition=pos1 (configured in act 1) and the duration (8 symbols) of the current PUSCH, as shown in FIG. 5.

Case 2: The PUSCH Crosses a Slot Boundary and is Split

The time domain position of the first DMRS is determined according to the duration of the first PUSCH, the DMRS configuration information and a second correspondence relation.

The second correspondence relation is a correspondence relation among durations of PUSCHs, DMRS configuration information and time domain position of DMRSs.

For the PUSCH repetition transmission, the same first correspondence relation or second correspondence relation is adopted; wherein the PUSCH includes the first PUSCH obtained by splitting and a second PUSCH which is not split.

For PUSCHs obtained by splitting, as shown by first DMRS configurations of the 2nd and 3rd repetition transmissions of the first PUSCH in FIG. 5, table 1 is looked up to determine that the column numbers and time domain positions of their DMRSs are respectively the first symbol in the PUSCH (when the duration of the PUSCH is 2 symbols) and the first and the fifth symbols in the PUSCH (when the duration of the PUSCH is 6 symbols) according to the time domain resource indication mode Type B, dmrs-AdditionalPosition=pos1 (configured in act 1) and respective durations (2 symbols and 6 symbols) of the first PUSCHs, as shown in FIG. 5.

In addition, if a PUSCH repetition is abandoned due to some other reason, such as fewer PUSCH time domain resources, the corresponding DMRS will not be sent. That is to say, this processing mode mainly focuses on an additional DMRS configuration problem caused by the change of a PUSCH duration, and does not exclude further enhancement based on this.

TABLE 1

| Duration of data transmission | Time domain position of DMRS | | | | | | | |
|---|---|---|---|---|---|---|---|---|
| | PUSCH mapping type A dmrs-AdditionalPosition | | | | PUSCH mapping type B dmrs-AdditionalPosition | | | |
| | 0 | 1 | 2 | 3 | 0 | 1 | 2 | 3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

Notes:

$l_0$ is a time domain position of the front-load DMRS. For PUSCH mapping Type A, $l_0$ is configured by a higher layer signaling, e.g. dmrs-TypeA-Position. For PUSCH mapping type B, $l_0$ = 0. $l_0$ = 0 represents the first symbol, and so on.

In act 4.2, the terminal repeatedly sends the PUSCH and corresponding DMRSs based on the transmission resources for repeatedly sending the PUSCH and the positions of the corresponding DMRSs determined in act 4.1.

In act 5, the network side receives the repeatedly sent PUSCH and the corresponding DMRS, and demodulates the PUSCH based on DMRS detection.

Processing case 2 The first PUSCH is obtained by splitting the second PUSCH at a slot boundary.

In this processing case, an initially configured second DMRS is truncated according to a duration of the first PUSCH obtained by splitting. Therefore, the first DMRS can match the first PUSCH obtained by splitting, ensuring its tracking of the channel in the time domain and improving the channel estimation performance.

In act 1, a network side configures a DMRS parameter, wherein the DMRS parameter includes dmrs-AdditionalPosition for indicating the number of sets of an additional DMRS.

In act 2, a terminal side receives the DMRS parameter.

In act 3, the network side sends downlink control information for scheduling PUSCH repetition transmission.

Figure 6:
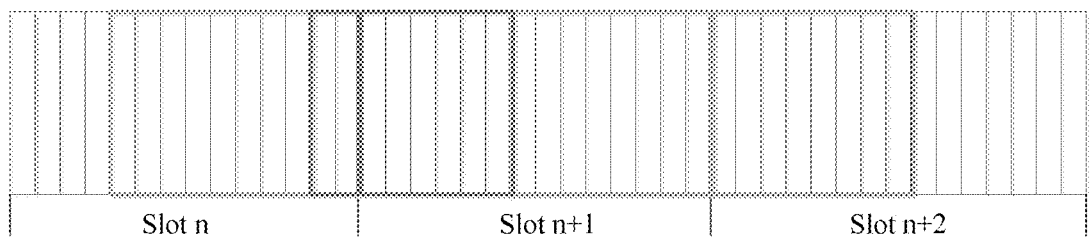

For example, the network side sends UL grant for scheduling the PUSCH repetition transmission. TypeB is the time domain resource indication mode. For example, the number of the PUSCH repetitions is 4, a time domain position of a $1^{st}$ PUSCH repetition is the $5^{th}$ to $12^{th}$ symbols of the $n^{th}$ slot, and a subsequent PUSCH repetition immediately follows a resource of a previous PUSCH repetition in the time domain. Therefore, the time domain resources of the four PUSCH repetitions can be known as shown in FIG. 6, and the four PUSCH repetitions are split into five PUSCH repetitions for a slot boundary is crossed.

In act 4, the terminal side receives the downlink control information and repeatedly sends the PUSCHs and the corresponding DMRSs according to the downlink control information.

Figure 7:
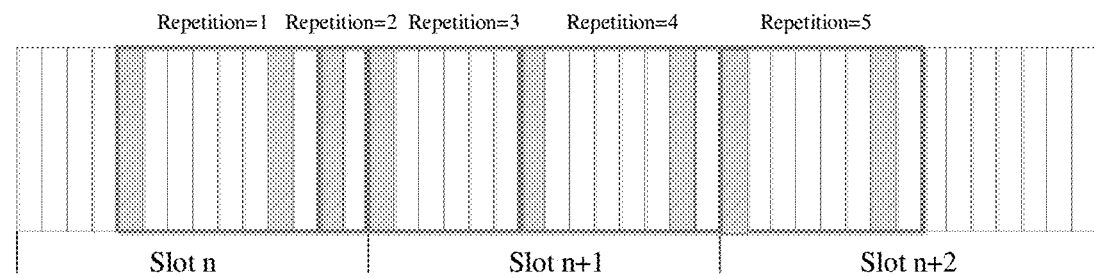

In act 4.1, the terminal side receives the downlink control information, and determines transmission resources for repeatedly sending the PUSCH and time domain positions of corresponding DMRSs according to the downlink control information, as shown in FIG. 7.

Case 1: One of PUSCH Repetition(s) does not Cross a Slot Boundary

For a PUSCH which is not split, as shown by the DMRS configurations of the 1st, 4th and 5th PUSCH repetition transmissions in FIG. 7, table 1 is looked up to determine that a time domain position of its DMRS is the first and the seventh symbols in the PUSCH according to the time domain resource indication mode Type B, dmrs-AdditionalPosition=pos1 (configured in act 1) and the duration (8 symbols) of the current PUSCH, as shown in FIG. 7.

Case 2: A Time Domain Position of a Second DMRS is Determined According to a Duration of the Second PUSCH and DMRS Configuration Information.

The time domain position of the second DMRS may be truncated based on the duration of the first PUSCH.

Herein, determining the time domain position of the second DMRS according to the duration of the second PUSCH and the DMRS configuration information further includes determining the time domain position of the second DMRS according to the duration of the second PUSCH, the DMRS configuration information, and a first correspondence relation; wherein the first correspondence relation is a correspondence relation among durations of PUSCHs, DMRS configuration information and time domain positions of DMRSs.

Specifically, for PUSCHs obtained by splitting, as shown by the DMRS configurations of the 2nd and 3rd PUSCH repetition transmissions in FIG. 7, additional DMRSs outside PUSCH durations of 2 symbols and 6 symbols are truncated to determine that the time domain positions of their DMRSs are respectively the first symbol in the PUSCH (when the duration of the PUSCH is 2 symbols) and the first symbol in the PUSCH (when the duration of the PUSCH is 6 symbols) according to the time domain resource indication mode Type B, dmrs-AdditionalPosition=pos1 (configured in act 1) and respective durations (2 symbols and 6 symbols) of the current PUSCHs, as shown in FIG. 7.

In addition, if a PUSCH repetition is abandoned due to some other reason, such as fewer PUSCH time domain resources, the corresponding DMRS will not be sent.

In act 4.2, the terminal repeatedly sends the PUSCH and corresponding DMRSs based on the transmission resources for repeatedly sending the PUSCH and the positions of the corresponding DMRSs determined in act 4.1.

In act 5, the network side receives the repeatedly sent PUSCH and the corresponding DMRS, and demodulates the PUSCHs based on DMRS detection. Herein, an approach for determining the time domain position of the DMRS is the same as that in act 4.1.

It should also be noted that for the PUSCH repetition transmission, the same first correspondence relation or second correspondence relation is adopted; wherein the PUSCH includes the first PUSCH obtained by splitting and a second PUSCH which is not split. The first correspondence relation and/or the second correspondence relation adopt a table in 3GPP TS 38.211 v15.4.0, as shown by table 1.

In addition, this embodiment further provides a processing case, in which the first PUSCH is obtained by splitting the second PUSCH based on slot format information (SFI). Specifically, when first PUSCHs obtained by splitting are obtained based on SFI interruption, if the first PUSCHs obtained by splitting meet a first condition, at least two PUSCHs obtained by splitting share the DMRS.

Herein, the first condition includes: an interval between the PUSCHs obtained by splitting is less than N symbols, wherein N is a non-negative integer.

Figure 8:
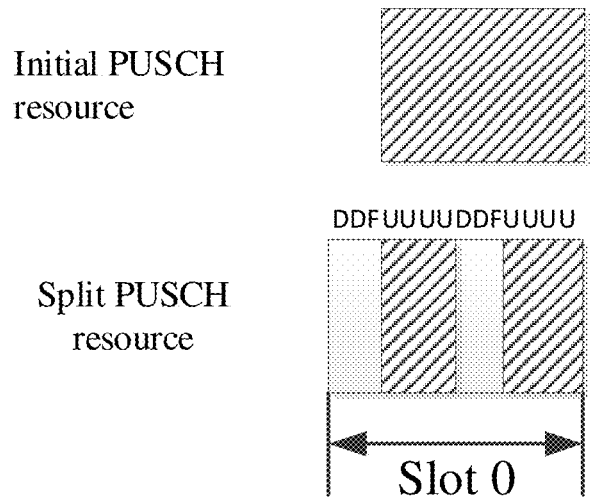
Figure 9:
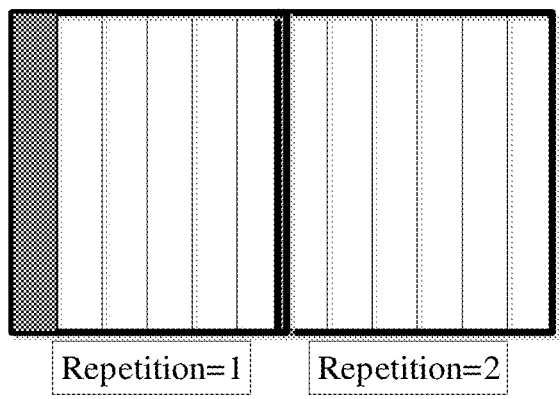

The SFI interruption means that when a time domain position corresponding to an initial PUSCH contains a downlink symbol and/or a flexible symbol, the initial PUSCH will be split into multiple segments, as shown in FIG. 8.

There are two approaches for determining the time domain positions of the DMRSs of the PUSCHs after the SFI interruption.

In one approach, if PUSCHs after the SFI interruption are independent PUSCHs, the determination of the time domain position of the DMRS of each PUSCH is processed in the same way as those in the above-described processing cases.

In another approach, if the first PUSCHs after the SFI interruption meet a first condition and are still one PUSCH, DMRS configuration of the initial PUSCH is adopted.

Furthermore, if the time domain position of the DMRS of the initial PUSCH is at the downlink symbol and/or the flexible symbol, the DMRS is discarded.

If the PUSCHs after the SFI interruption do not meet the first condition, the first PUSCHs obtained by splitting are independent PUSCHs, and a DMRS configuration method refers to the processing in the several processing cases described above.

The first condition is that the interval between the PUSCHs obtained by splitting is less than N symbols, wherein N is a non-negative integer, for example, N is 4.

It should also be noted that in this embodiment when the DMRS is a double-symbol DMRS and a first PUSCH obtained by splitting cannot carry the double-symbol DMRS, the double-symbol DMRS is discarded.

The double-symbol DMRS has one more column of DMRS than the single-symbol DMRS. Compared with the single-symbol DRMS, further enhancement is needed.

Figures 11, 12, 13, 14:
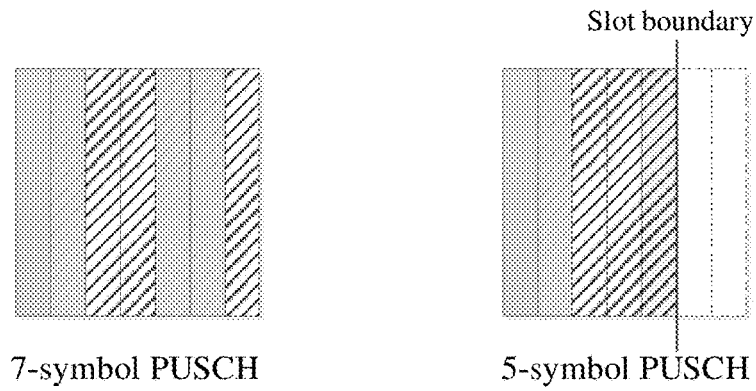

If a complete double-symbol DMRS set cannot be carried, the double-symbol DMRS set is discarded. For example, as shown in FIG. 11, an original PUSCH has a duration of 7 symbols, and the DMRS time domain position thereof is determined to be the first, second, fifth and sixth symbols by looking up table 1. When the PUSCH crosses slots, it is split into a 5-symbol PUSCH and a 2-symbol PUSCH. For the 5-symbol PUSCH, a second set of DMRSs can only be partially mapped, that is, a DMRS in one symbol is mapped on the fifth symbol, but a DMRS in the other symbol cannot be mapped, so the second set of DMRS symbols are discarded, which brings technical advantages of avoiding invalid DMRS mapping, being used for data transmission and improving the reliability of data transmission. For the 2-symbol PUSCH, since the PUSCH resource can only carry the DMRS but not data, it is discarded directly, which can save uplink resources and power. Another approach is to carry the 2-symbol DMRS, which has technical advantage of avoiding discontinuous transmission phases caused by transmission pause.

In addition, for the PUSCH repetition transmission, the use of the double-symbol DMRS may also be restricted, because the double-symbol DMRS is mostly used for multi-antenna port transmission, and PUSCH repetition is mostly used for transmission of small data packets (low delay) or transmission with limited coverage, the scenario of which cannot support the multi-antenna port transmission. Restricting the double-symbol DMRS can not only reduce the complexity of standard and implementation, but also not affect the actual use effect.

In another example, as shown in FIG. 12, a DMRS configuration method is provided, including the act 31.

In act 31, time domain positions of M DMRSs are respectively determined according to durations of the M PUSCHs and DMRS configuration information, wherein M is an integer greater than or equal to 2.

Herein, for a $1^{st}$ PUSCH of the M PUSCHs, a time domain position of a DMRS is determined by adopting a first time domain resource indication mode.

Figure 10:
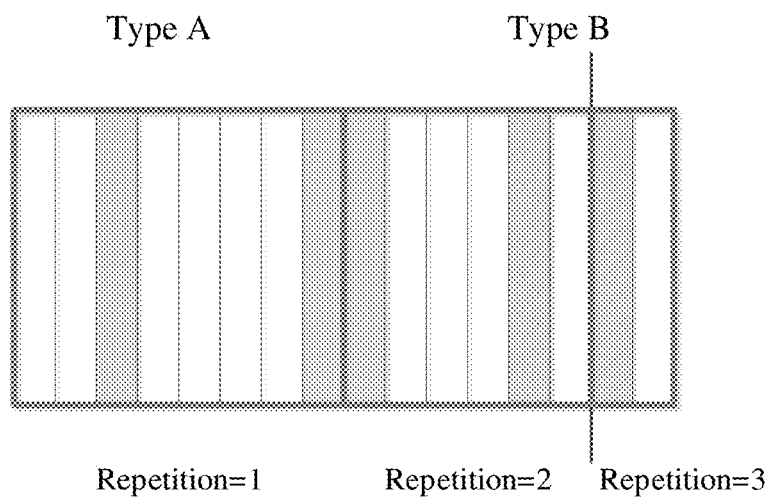

Compared with the second time-domain resource indication mode Type B, the first time-domain resource indication mode Type A has a limited time-domain starting position, and a reference starting point of the DMRS is a slot boundary. In case of PUSCH repetition, a transmission resource and a time domain position of DMRS of the $1^{st}$ PUSCH repetition may adopt the existing technology, but the time domain position of the $2^{nd}$ or subsequent PUSCH repetition is different from the time domain position of the $1^{st}$ PUSCH repetition, while the time-domain position of the DMRS still refers to the slot boundary and the time-domain position is determined according to an initial configuration. In this way there is a case where the DMRS is not within the resource of PUSCH. As shown in FIG. 10, the PUSCH repetition adopts the Type A resource indication mode, and the number of the PUSCH repetitions is 2, time domain resources of the $1^{st}$ PUSCH repetition is the first to sixth symbols, and the time domain position of the DMRS is $l_0=0$. Time domain resources of the $2^{nd}$ PUSCH repetition immediately follow that of the $1^{st}$ PUSCH repetition. However, since the DMRS refers to the slot boundary and $l_0=0$, the time domain position of the DMRS is still at the first symbol, which is not within a range of the $2^{nd}$ PUSCH repetition, leading to that the $2^{nd}$ PUSCH is unable to be demodulated normally.

In order to ensure that the $2^{nd}$ and subsequent PUSCH repetitions can be demodulated, each PUSCH repetition needs to include the DMRS. Therefore, for Type A, it is needed to determine the DMRSs in the $2^{nd}$ and subsequent PUSCHs, thus the following processings are provided.

In a first processing, a time domain position of a DMRS in the $m^{th}$ PUSCH of M PUSCHs is the same as that in the $1^{st}$ PUSCH determined by the first time domain resource indication mode; wherein m is an integer greater than or equal to 2.

That is to say, the relative time domain position of the DMRS of each of the $2^{nd}$ and subsequent PUSCH repetitions is the same as that of the $1^{st}$ PUSCH repetition.

Furthermore, if the durations of the $2^{nd}$ and subsequent PUSCH repetitions are different from that of the $1^{st}$ PUSCH repetition, a truncation approach is adopted.

In a second processing, the time domain position of a DMRS in the $m^{th}$ PUSCH of the M PUSCHs is determined by adopting the second time domain resource indication mode; wherein M is an integer greater than or equal to 2, and m is an integer greater than or equal to 2.

That is to say, the time domain positions of the DMRSs of the $2^{nd}$ and subsequent PUSCH repetitions are understood according to the mode of type B. As an example shown in FIG. 10, if the time domain position of the DRMS of the $2^{nd}$ PUSCH repetition is based on the resource mapping mode Type B, then the first set of DMRSs is located on the first symbol of the second PUSCH repetition. If there is a second set of DMRSs, the time domain position of the second set of DMRSs is also determined according to the mode of Type B. Specifically, columns related to the Type B are referred to when Table 1 is looked up.

In addition, for uplink PUSCH transmission, the resource indication mode of Type B can cover all cases of Type A. Therefore, for PUSCH repetition, only the resource indication mode of Type B can be supported, which not only does not affect the flexibility of resource scheduling, but also does not cause the problem of determining the time domain position of a DMRS corresponding to type A, thus reducing the complexity of the standard.

By adopting the above solution, the DMRS can be configured according to the number of symbols of the first PUSCH obtained by splitting, so that the reconfigured first DMRS can match the first PUSCH obtained by splitting, ensuring its tracking of the channel in the time domain and improving the channel estimation performance.

An embodiment of the present invention provides a user equipment (UE), as shown in FIG. 13, the UE includes: a first processing unit 41, which determines a time domain position of a first DMRS according to a duration of a first PUSCH and DMRS configuration information.

The first PUSCH is obtained by splitting a second PUSCH.

The DMRS configuration information includes at least one of a DMRS starting position and a DMRS additional position.

It should be understood that the solution provided in this embodiment may further include: a time domain position of a second DMRS is determined according to a duration of a second PUSCH and DMRS configuration information. That is, the time domain position of the second DMRS may be determined in advance based on the second PUSCH and the DMRS configuration information.

When the second PUSCH is split to obtain at least one first PUSCH, then the time domain position of the first DMRS corresponding to the first PUSCH may be determined according to the duration of the first PUSCH and the DMRS configuration information.

Herein, the time domain position of the second DMRS may be truncated based on the duration of the first PUSCH.

That is, the time domain positions of the first DMRS and the second DMRS may be same or different, and the first DMRS may be obtained by truncating the second DMRS.

Or, the time domain position of the first DMRS is determined according to the duration of the first PUSCH, the DMRS configuration information and a second correspondence relation; wherein the second correspondence relation is a correspondence relation among durations of PUSCHs, DMRS configuration information and time domain positions of DMRSs. That is to say, there is still a case where the time domain position of the first DMRS is re-determined, instead of truncating the second DMRS to obtain the first DMRS.

It should also be noted that in this embodiment, in the at least one first PUSCH obtained by splitting the second PUSCH, the durations of different first PUSCHs may be same or different.

For example, in this embodiment, according to a duration of a first PUSCH obtained by splitting, a time domain position of an additional DMRS in a DMRS may be updated, or the additional DMRS may be truncated. Therefore, the first DMRS can match the first PUSCH obtained by splitting, ensuring its tracking of the channel in time domain and improving channel estimation performance.

A main flow of this embodiment will be explained with reference to FIG. 3. Firstly, a UE receives a DMRS parameter configured by a network side; then, the network side sends downlink control information (DCI) to the UE, wherein the DCI is used for scheduling PUSCH repetition transmission; and the UE sends the PUSCH repetition and its corresponding DMRS to the network side, that is, sends a first PUSCH and a first DMRS corresponding to the first PUSCH to the network side.

This embodiment is described below through various processing cases.

Processing Case 1

The first PUSCH is obtained by splitting the second PUSCH at a slot boundary. Furthermore, according to a duration of the PUSCH obtained by splitting, an existing protocol is queried to determine a time domain position of the DMRS. Therefore, the first DMRS can match the first PUSCH obtained by splitting, ensuring its tracking of the channel in the time domain and improving channel estimation performance.

Case 1: The PUSCH does not Cross a Slot Boundary

A time domain position of a second DMRS is determined according to a duration of the second PUSCH, the DMRS configuration information, and a first correspondence relation; wherein the first correspondence relation is a correspondence relation among durations of PUSCHs, DMRS configuration information and time domain positions of DMRSs. The first correspondence relation is predefined.

For a PUSCH which is not split, as shown by the DMRS configurations of the 1st, 4th and 5th repetition transmissions of the second PUSCH in FIG. 5, table 1 is looked up to determine that a time domain position of its DMRS is the first and the seventh symbols in the PUSCH according to the second time domain resource indication mode Type B, dmrs-AdditionalPosition=pos1 (configured in act 1) and the duration (8 symbols) of the current PUSCH, as shown in FIG. 5.

Case 2: The PUSCH Crosses a Slot Boundary and is Split

The time domain position of the first DMRS is determined according to the duration of the first PUSCH, the DMRS configuration information and a second correspondence relation.

The second correspondence relation is a correspondence relation among durations of PUSCHs, DMRS configuration information and time domain positions of DMRSs.

For the PUSCH repetition transmission, the same first correspondence relation or second correspondence relation is adopted; wherein the PUSCH includes the first PUSCH obtained by splitting and a second PUSCH which is not split.

In addition, if a PUSCH repetition is abandoned due to some other reason, such as fewer PUSCH time domain resources, the corresponding DMRS will not be sent. That is to say, this processing mode mainly focuses on an additional DMRS configuration problem caused by the change of a PUSCH duration, and does not exclude further enhancement based on this.

Processing Case 2

The first PUSCH is obtained by splitting the second PUSCH at a slot boundary.

In this processing case, an initially configured second DMRS is truncated according to a duration of the first PUSCH obtained by splitting. Therefore, the first DMRS can match the first PUSCH obtained by splitting, ensuring its tracking of the channel in the time domain and improving the channel estimation performance.

Case 1: One of PUSCH Repetition (s) does not Cross a Slot Boundary

For a PUSCH which is not split, as shown by the DMRS configurations of the 1st, 4th and 5th PUSCH repetition transmissions in FIG. 7, table 1 is looked up to determine that a time domain position of its DMRS is the first and the seventh symbols in the PUSCH according to the time domain resource indication mode Type B, dmrs-AdditionalPosition=pos1 (configured in act 1) and the duration (8 symbols) of the current PUSCH, as shown in FIG. 7.

Case 2: A Time Domain Position of a Second DMRS is Determined According to a Duration of the Second PUSCH and DMRS Configuration Information.

The time domain position of the second DMRS may be truncated based on the duration of the first PUSCH.

Herein, determining the time domain position of the second DMRS according to the duration of the second PUSCH and the DMRS configuration information further includes determining the time domain position of the second DMRS according to the duration of the second PUSCH, the DMRS configuration information, and a first correspondence relation; wherein the first correspondence relation is a correspondence relation among durations of PUSCHs, DMRS configuration information and time domain positions of DMRSs.

Specifically, for the PUSCHs obtained by splitting, as shown by the DMRS configurations of the 2nd and 3rd PUSCH repetition transmissions in FIG. 7, additional DMRSs outside PUSCH durations of 2 symbols and 6 symbols are truncated to determine that the time domain positions of their DMRSs are respectively the first symbol in the PUSCH (when the duration of the PUSCH is 2 symbols) and the first symbol in the PUSCH (when the duration of the PUSCH is 6 symbols) according to the time domain resource indication mode Type B, dmrs-AdditionalPosition=pos1 (configured in act 1) and respective durations (2 symbols and 6 symbols) of the current PUSCHs, as shown in FIG. 7.

In addition, if a PUSCH repetition is abandoned due to some other reason, such as fewer PUSCH time domain resources, the corresponding DMRS will not be sent.

In addition, this embodiment further provides a processing case, in which the first PUSCH is obtained by splitting the second PUSCH based on SFI. Specifically, when first PUSCHs obtained by splitting are obtained based on SFI interruption, if the first PUSCHs obtained by splitting meet a first condition, at least two PUSCHs obtained by splitting share the DMRS.

Herein, the first condition includes: an interval between the PUSCHs obtained by splitting is less than N symbols, wherein N is a non-negative integer.

The SFI interruption means that when a time domain position corresponding to an initial PUSCH contains a downlink symbol and/or a flexible symbol, the initial PUSCH will be split into multiple segments, as shown in FIG. 8.

There are two approaches for determining the time domain position of the DMRS of the PUSCH after the SFI interruption.

In one approach, if PUSCHs after the SFI interruption are independent PUSCHs, the determination of the time domain position of the DMRS of each PUSCH is processed in the same way as those in the above-described processing cases.

In another approach, if the first PUSCHs after the SFI interruption meet a first condition and are still one PUSCH, DMRS configuration of the initial PUSCH is adopted.

Another embodiment provides a UE. As shown in FIG. 14, the UE includes: a second processing unit 51, which determines time domain positions of M DMRS respectively according to durations of M PUSCHs and DMRS configuration information, wherein M is an integer greater than or equal to 2.

Herein, for a $1^{st}$ PUSCH of the M PUSCHs, a time domain position of a DMRS is determined by adopting a first time domain resource indication mode.

Compared with the second time-domain resource indication mode Type B, the first time-domain resource indication mode Type A has a limited time-domain starting position, and a reference starting point of the DMRS is a slot boundary. In case of PUSCH repetition, a transmission resource and a time domain position of the DMRS of the $1^{st}$ PUSCH repetition may adopt the existing technology, but the time domain position of the $2^{nd}$ or subsequent PUSCH repetition is different from the time domain position of the $1^{st}$ PUSCH repetition, while the time domain position of the DMRS still refers to the slot boundary and the time-domain position is determined according to an initial configuration.

In order to ensure that the $2^{nd}$ and subsequent PUSCH repetitions can be demodulated, each PUSCH repetition needs to include the DMRS. Therefore, for Type A, it is needed to determine the DMRSs in the $2^{nd}$ and subsequent PUSCHs, thus the following processing is provided.

In a first processing, a time domain position of a DMRS in the $m^{th}$ PUSCH of the M PUSCHs is the same as that in the $1^{st}$ PUSCH determined by the first time domain resource indication mode; wherein m is an integer greater than or equal to 2.

Furthermore, if the durations of the $2^{nd}$ and subsequent PUSCH repetitions are different from that of the $1^{st}$ PUSCH repetition, a truncation approach is adopted.

In a second processing, the second processing unit 51 determines the time domain position of a DMRS in the $m^{th}$ PUSCH of the M PUSCHs by adopting the second time domain resource indication mode; wherein M is an integer greater than or equal to 2, and m is an integer greater than or equal to 2.

By adopting the above solution, the DMRS can be configured according to the number of symbols of the first PUSCH obtained by splitting, so that the reconfigured first DMRS can match the first PUSCH obtained by splitting, ensuring its tracking of the channel in the time domain and improving the channel estimation performance.

An embodiment of the present application further provides a computer-readable storage medium configured to store a computer program.

Optionally, the computer readable storage medium may be applied to a network device in an embodiment of the present application, and the computer program enables a computer to perform the corresponding processes implemented by the network device in various methods of the embodiments of the present application, which will not be repeated here for brevity.

Optionally, the computer readable storage medium may be applied to a terminal device in embodiments of the present application, and the computer program enables a computer to perform the corresponding processes implemented by the mobile terminal/terminal device in various methods of the embodiments of the present application, which will not be repeated here for brevity.

An embodiment of the present application further provides a computer program product including computer program instructions.

Optionally, the computer program product may be applied to a network device in an embodiment of the present application, and the computer program instructions enable a computer to perform the corresponding processes implemented by the network device in various methods of the embodiments of the present application, which will not be repeated here for brevity.

Optionally, the computer program product may be applied to a mobile terminal/terminal device in embodiments of the present application, and the computer program instructions enable a computer to perform the corresponding processes implemented by the mobile terminal/terminal device in various methods of the embodiments of the present application, which will not be repeated here for brevity.

An embodiment of the present application further provides a computer program.

Optionally, the computer program may be applied to a network device in embodiments of the present application. When the computer program is run on a computer, the computer is enabled to perform the corresponding processes implemented by the network device in various methods of the embodiments of the present application, which will not be repeated here for brevity.

Optionally, the computer program may be applied to a mobile terminal/terminal device in embodiments of the present application. When the computer program is run on a computer, the computer is enabled to perform the corresponding processes implemented by the mobile terminal/terminal device in various methods of the embodiments of the present application, which will not be repeated here for brevity.

Those of ordinary skill in the art will recognize that the exemplary elements and algorithm acts in combination with the embodiments disclosed herein may be implemented in electronic hardware, or a combination of computer software and electronic hardware. Whether these functions are implemented in hardware or software depends on the specific application and design constraints of the technical solution. Those skilled in the art may use different methods to implement the described functions for each particular application, but such implementation should not be considered to be beyond the scope of the present application.

Those skilled in the art may clearly understand that for the sake of convenience and conciseness of description, the specific working processes of the systems, devices and units described above may be described with reference to the corresponding processes in the above method embodiments and will not be repeated herein.

In several embodiments provided by the present application, it should be understood that the disclosed systems, devices and methods may be implemented in another manner. For example, the device embodiments described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the embodiments.

In addition, various functional units in various embodiments of the present application may be integrated into one processing unit, or may exist physically separately, or two or more than two units may be integrated into one unit.

The function, if achieved in a form of software functional units and sold or used as a separate product, may be stored in a computer-readable storage medium. Based on this understanding, the technical solution of the present application, in essence, or the part contributing to the prior art, or the part of the technical scheme, may be embodied in the form of a software product, which is stored in a storage medium, and includes several instructions for enabling a computer device (which may be a personal computer, a server, a network device or the like) to perform all or part of the acts of the method described in various embodiments of the present application. The aforementioned storage medium includes various media, such as a U disk, a mobile hard disk, a read-only memory (ROM), a random access memory (RAM), a magnetic disk, or an optical disk, which are capable of storing program codes.

What are described above are merely specific implementations of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be subject to the protection scope of the claims.

What is claimed is:

1. A demodulation reference signal (DMRS) configuration method, applied to a user equipment (UE), comprising:
    obtaining a first physical uplink shared channel (PUSCH) by splitting a second PUSCH based on a downlink symbol;
    determining a time domain position of a first DMRS for the first PUSCH according to a duration of the first PUSCH and DMRS configuration information;
    wherein in response to an event that first PUSCHs obtained by splitting based on the downlink symbol meet a first condition, at least two PUSCHs obtained by splitting based on the downlink symbol share a DMRS; wherein the first condition comprises: an interval between PUSCHs obtained by splitting is less than N symbols, and N is a non-negative integer.

2. The DMRS configuration method of claim 1, wherein the DMRS configuration information comprises at least one of a DMRS starting position and a DMRS additional position.

3. The DMRS configuration method of claim 1, wherein determining the time domain position of the first DMRS according to the duration of the first PUSCH and the DMRS configuration information further comprises:
    determining the time domain position of the first DMRS according to the duration of the first PUSCH, the DMRS configuration information and a second correspondence relation;
    wherein the second correspondence relation is a correspondence relation among durations of PUSCHs, DMRS configuration information and time domain positions of DMRSs; and the second correspondence relation is predefined.

4. The DMRS configuration method of claim 3, further comprising:
    adopting a same second correspondence relation for repetition transmission of a PUSCH, wherein the PUSCH comprises the first PUSCH obtained by splitting and another second PUSCH which is not split.

5. The DMRS configuration method of claim 3, wherein the second correspondence relation adopts a table in 3GPP TS 38.211 v15.4.0.

6. A user equipment (UE), comprising:
    a first processor, configured to obtain a first physical uplink shared channel (PUSCH) by splitting a second PUSCH based on a downlink symbol, and determine a time domain position of a first demodulation reference signal (DMRS) for the first PUSCH according to a duration of the first PUSCH and DMRS configuration information;
    wherein if first PUSCHs obtained by splitting based on the downlink symbol meet a first condition, at least two PUSCHs obtained by splitting based on the downlink symbol share a DMRS; wherein the first condition comprises: an interval between PUSCHs obtained by splitting is less than N symbols, and N is a non-negative integer.

7. The UE of claim 6, wherein the DMRS configuration information comprises at least one of a DMRS starting position and a DMRS additional position.

8. The UE of claim 6, wherein the first processor is configured to determine the time domain position of the first DMRS according to the duration of the first PUSCH, the DMRS configuration information and a second correspondence relation;
    wherein the second correspondence relation is a correspondence relation among durations of PUSCHs, DMRS configuration information and time domain positions of DMRSs; and the second correspondence relation is predefined.

9. The UE of claim 8, wherein the first processor is configured to adopt a same second correspondence relation for repetition transmission of a PUSCH, wherein the PUSCH comprises the first PUSCH obtained by splitting and another second PUSCH which is not split.

10. The UE of claim 8, wherein the second correspondence relation adopts a table in 3GPP TS 38.211 v15.4.0.

11. A demodulation reference signal (DMRS) configuration method, applied to a network device, and comprising:
    configuring DMRS configuration information;
    receiving a first physical uplink shared channel (PUSCH) and a first DMRS corresponding to the first PUSCH;
    wherein the first PUSCH is obtained by splitting a second PUSCH based on a downlink symbol, and a time domain position of the first DMRS for the first PUSCH is determined according to a duration of the obtained first PUSCH and the DMRS configuration information; and
    in response to an event that first PUSCHs obtained by splitting based on the downlink symbol meet a first condition, at least two PUSCHs obtained by splitting based on the downlink symbol share a DMRS; wherein the first condition comprises: an interval between PUSCHs obtained by splitting is less than N symbols, and N is a non-negative integer.

12. The DMRS configuration method of claim 11, wherein the DMRS configuration information comprises at least one of a DMRS starting position and a DMRS additional position.

13. The DMRS configuration method of claim 11, wherein the time domain position of the first DMRS is determined according to the duration of the first PUSCH, the DMRS configuration information and a second correspondence relation;
   wherein the second correspondence relation is a correspondence relation among durations of PUSCHs, DMRS configuration information and time domain positions of DMRSs; and the second correspondence relation is predefined.

14. The DMRS configuration method of claim 13, wherein a same second correspondence relation is adopted for repetition transmission of a PUSCH, wherein the PUSCH comprises the first PUSCH obtained by splitting and another second PUSCH which is not split.

* * * * *